H. L. PERRINE.
AUTOMATIC TRAIN-BRAKE.
No. 193,279. Patented July 17, 1877.
4 Sheets—Sheet 1.
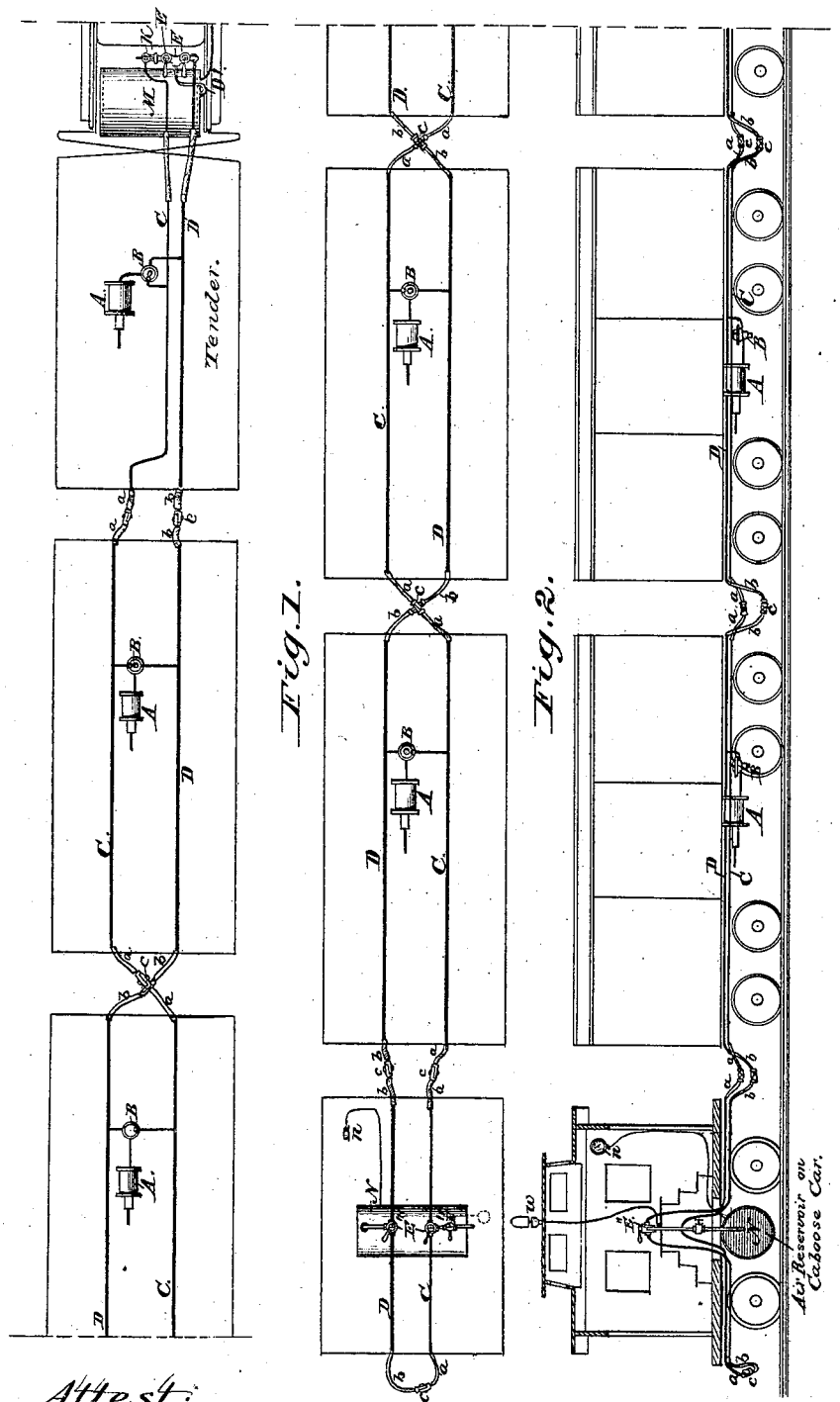

4 Sheets—Sheet 2.
H. L. PERRINE.
AUTOMATIC TRAIN-BRAKE.
No. 193,279. Patented July 17, 1877.
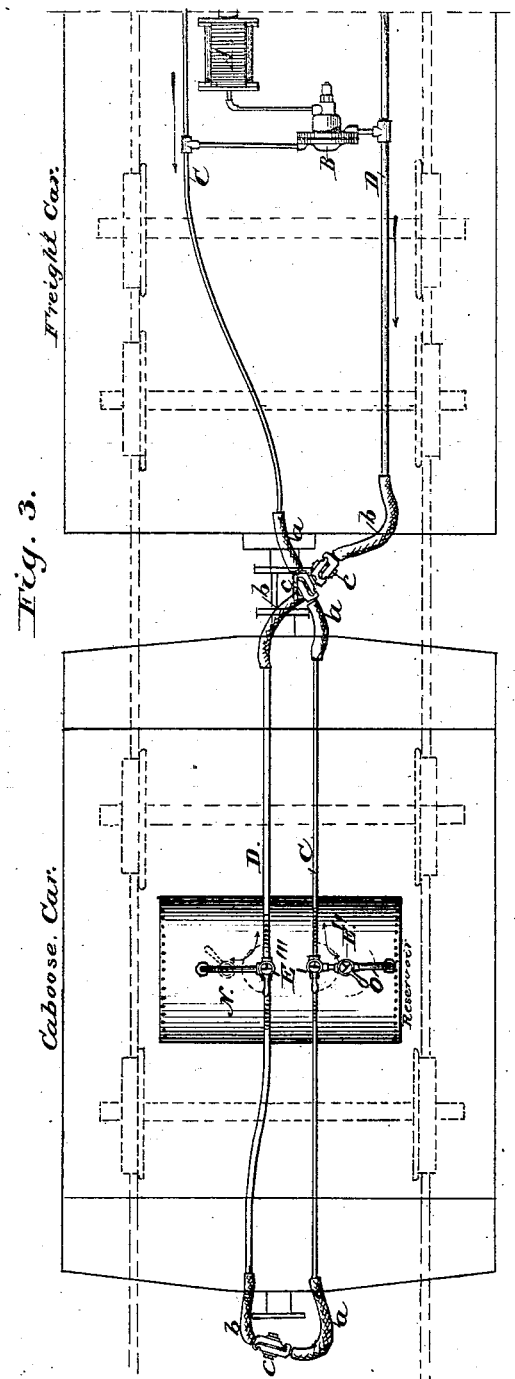
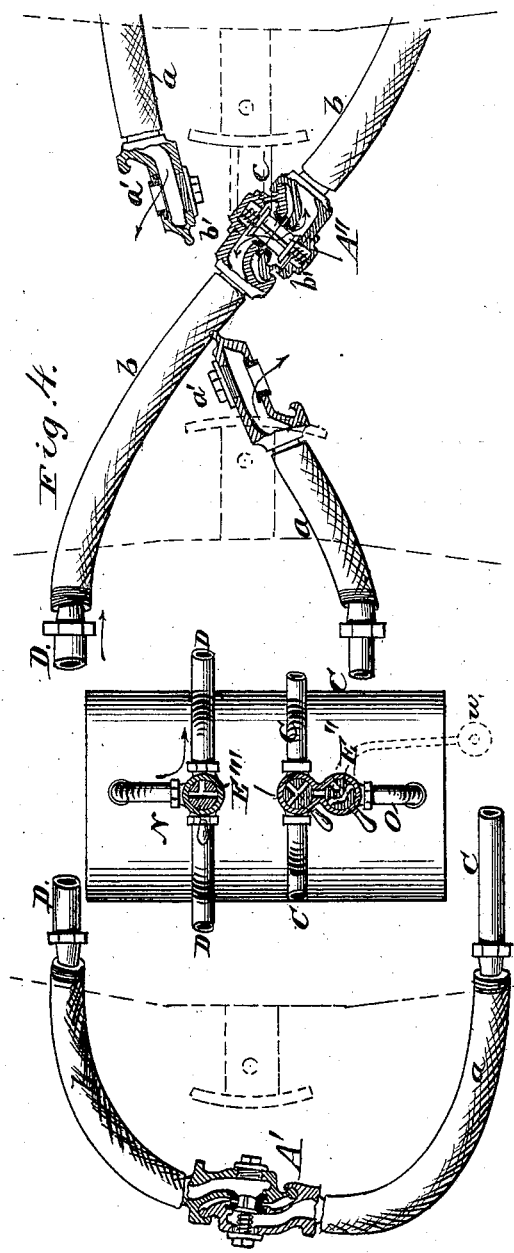
Attest:
Ulysses G. White
A. M. Cumming
H. L. Perrine.
Inventor.
By Wm. H. Finckel
Attorney.

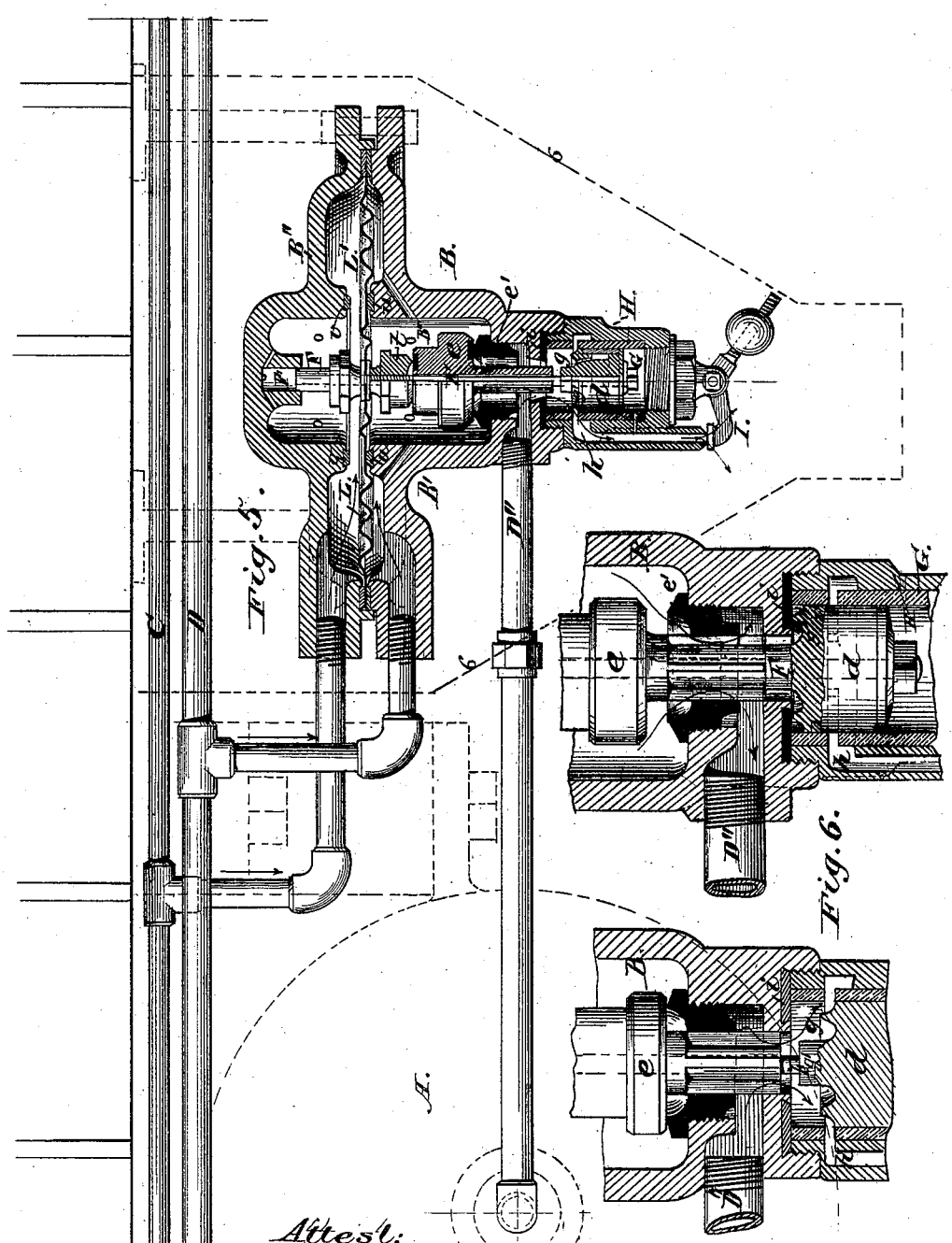

H. L. PERRINE.
AUTOMATIC TRAIN-BRAKE.
No. 193,279.  Patented July 17, 1877.
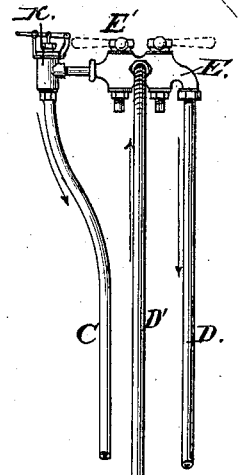
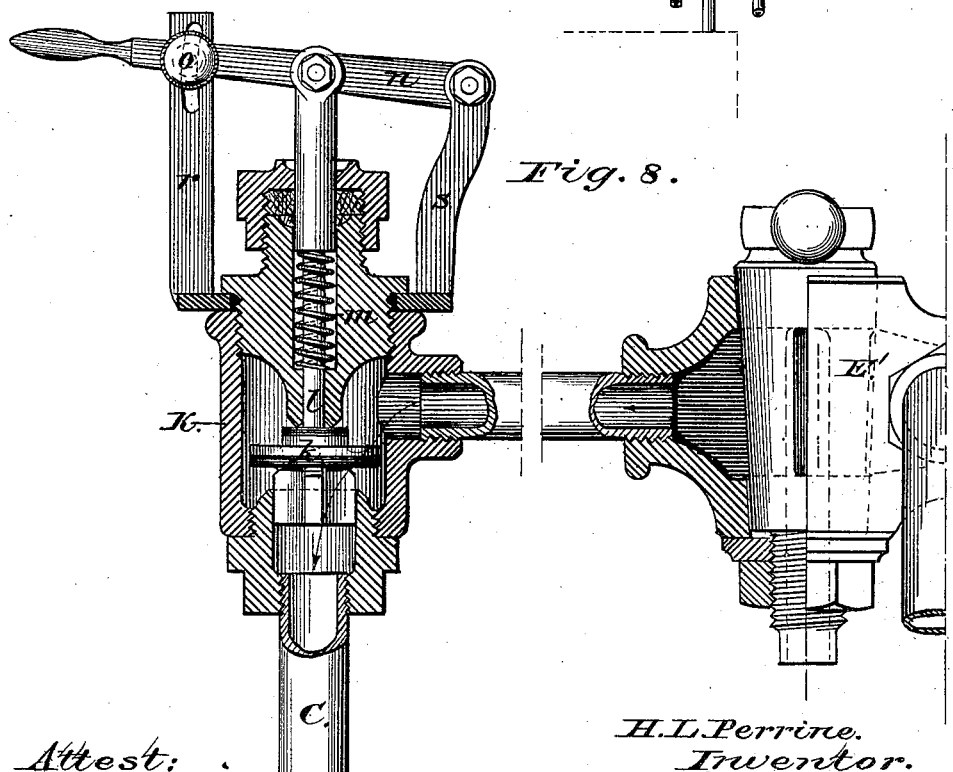

UNITED STATES PATENT OFFICE.

H. LANSING PERRINE, OF FREEHOLD, NEW JERSEY.

IMPROVEMENT IN AUTOMATIC TRAIN-BRAKES.

Specification forming part of Letters Patent No. 193,279, dated July 17, 1877; application filed April 17, 1877.

*To all whom it may concern:*

Be it known that I, H. LANSING PERRINE, of Freehold, in the county of Monmouth and State of New Jersey, have invented certain new and useful Improvements in Automatic Train-Brakes, of which the following is a full, clear, and exact description:

This invention is in the nature of an improvement in the system and apparatus for which Letters Patent of the United States of America were granted to me the 2d day of November, A. D. 1875, and numbered 169,575; and the invention is specially designed for use as an automatic train-brake for freight-cars.

The invention consists in a brake mechanism, having two independent lines of pipes, connected by valves with the several brake-cylinders, in which pipes and valves is normally maintained an equilibrium of air-pressure, and which pipes are connected or united throughout a train by such couplings as will, when the train parts by accident or otherwise, allow the air to escape from one of the pipes on both sections of the parted train, and be retained in the other pipes, whereby there is such action on the part of the valves on the cars of the two sections as will admit the air into the brake-cylinders and set the brakes, this action of the valves being due to the destruction of the equilibrium of pressure therein consequent upon the escape of air from one of the lines of pipes.

The invention also consists in an improved construction of the valves for controlling the admission of air from the supply-pipes to the brake-cylinders and the exit of air from the brake-cylinders.

The invention also consists in providing a storage or auxiliary reservoir on the caboose or cabin-car that is now run with all long freight-trains, said reservoir receiving its supply of air from the main reservoir at the engine after the train is made up by being connected with the pipes supplying air to the brake-cylinders under each car of the train, the office of the said auxiliary reservoir being the storage of air for use upon the back section of a train when parted or not from the forward or locomotive section.

The invention also consists in a check-valve, located at the main reservoir end of those pipes through which the air escapes at the parting of the train, which check-valve closes or sets as the air escapes from said pipes, and thus prevents loss of air from the reservoir.

In the drawings illustrating my invention, Figure 1 is a plan (top) view of my apparatus. Fig. 2 is a side elevation of the rear end of a train, provided with a caboose, which is shown in section. Fig. 3 is a top-plan view, enlarged, of the caboose mechanism; Fig. 4, a similar view on a larger scale, and showing some of the parts in section. Fig. 5 is a sectional elevation of my improved brake-cylinder valve. Fig. 6 shows the positions of the valve plunger or piston when the brakes are on and off. Fig. 7 is a front elevation of the main reservoir, cocks, and valves; and Fig. 8, a sectional elevation of the last-named valve.

In the construction of my brake mechanism I employ two independent lines of pipe, C D, which branch from a pipe, D', at the reservoir M, usually employed and located at the locomotive. These two independent lines of pipes extend under each car, and are connected with a valve, B, on each car, and such valves are connected with the brake-cylinders A. The devices used to connect the pipes of one car with another, so as to form continuous lines under the train, consist of short pieces of hose *a a*, and couplings *a' a'* for uniting pipes C, and larger pieces of hose *b b* and couplings *b' b'* for joining pipes D. In the couplings *b' b'* are arranged check-valves A''. (See details, Fig. 4.) The couplings *a'* and *b'* are of the Westinghouse pattern, or any other suitable kind may be employed. In the pipe D', from which the pipes C D branch, are arranged cocks E E', of the construction shown in my patent No. 169,575, except that if desired the two cocks may have a common barrel, (see Figs. 1, 7, and 8,) that is to say, a barrel or casing in one piece and adapted to receive both cocks. The cocks E and E' control the admission of air to and its flow from the pipes D C, respectively. The pipe C is in addition provided at its reservoir end with a check-valve, K, which, like the cocks E E', is maintained, normally, open, so that the air may freely flow from the reservoir to the pipes. This valve K may consist of a piston or disk, k, arranged in a suitable shell, having a spring-stem, l, arranged in a shell-closing nut, m, so as to tend to lift or unseat the disk k. For positively closing the valve—that is, seating disk k—its stem l is connected to a lever, n, on a standard, s, which lever is adjustably attached or fastened to an arm, r, by a slot and set screw, o. I do not confine myself, however, to the use of this particular check-valve.

The brake-cylinders A may be of ordinary construction, and are connected with the valves B by pipes D''. The valves B are composed of two saucer-like shells, B' B'', bolted together at their edges, and forming chambers B''' and L'. In the chamber L', and between the meeting-edges of the shells B' B'', is secured a corrugated metallic diaphragm, L, solid throughout, except that a central opening is made for the passage of the valve-stem F, and this opening is packed air-tight about the stem. The pipe C enters the valve by a branch above the diaphragm L, and the pipe D in a similar manner below the diaphragm. (See Fig. 5.) On the stem F is fitted loosely a valve, e, having the conical valve-seat e', which valve is operated by the diaphragm and a piston on the end of stem F, to admit air to and shut it off from the brake-cylinder. The stem F projects above the diaphragm into a socket, F', in the shell B'', so as to insure correct working of the valve and prevent lateral displacement. u v are rubber or other gaskets, let into the shells on opposite sides of the diaphragm, to cushion the diaphram when moving in its chamber. H is a shell attached to or forming part of shell B', and which may be lined with any anti-friction material G. The stem F of the diaphragm extends into this shell and bears a piston-valve, d. This valve controls a port, h, which will presently appear as the cylinder exhaust-port. The valve has a knife-edge, which, coming in contact with the gasket i, insures a tight joint when it is set. The mouth of the port h is closed by a weighted lever-valve, I, for the purpose of excluding dust, &c., but which does not impede the efflux of air. The whole valve B may be inclosed in a casing, see dotted lines, (Fig. 5,) for the purpose of excluding dust, &c.

Upon the caboose or cabin-car of a freight-train I arrange a reservoir, N, which is connected with the supply-pipes C D, in each of which pipes, at their juncture with the reservoir, is fitted a three-way cock, E'''. A cock, E'', of the same kind as that at the locomotive or main reservoir, is placed between the cock E''' in the pipe C and the union of the pipe with the reservoir—that is, for instance, the cock E''' may be directly in the pipe C. A branch pipe, O, leads from this cock into the reservoir, and in this branch pipe is fitted the cock E''. This cock E'' is preferably the compound cock shown in my patent herein referred to.

My apparatus being constructed as above described, its operation is as follows: It will be understood that an equalized pressure of air is normally maintained in the two lines of pipes C D, and hence upon the diaphragms of the valves B while the train is running. To this end the cocks E E' (connecting these pipes with the main reservoir) and the check-valve K are kept open. In this condition the pistons e will be seated—that is, the valves B will be closed, and no air can enter the brake-cylinders. If the caboose and its reservoir, &c., are a part of the train, the cocks E''' and E'' will be turned, as in Fig. 4, (which are their normal positions,) so as to close communication between the caboose-reservoir and the pipe C.

When the engineer desires to apply, set, or put on the brakes, he turns the cock E' at the main reservoir, so as to close communication between the reservoir and pipe C, and bring the exhaust-port of said cock in line with the pipe C, so that the air in said pipe will escape into the atmosphere. By so doing the equilibrium of pressure upon the diaphragms of the valves B is destroyed, and there is an excess of pressure upon the lower side of such diaphragms, whereby they are raised, and, carrying with them the stems F, the valves e are unseated or opened, and the air escapes below them and passes through the pipes D'' into the brake-cylinders, forcing out the pistons therein, and applying the brakes. The brakes are released by turning the air into the pipes C again, so as to re-establish an equilibrium of pressure upon the diaphragms, and as this is done the valves e are seated, thereby cutting off the supply of air to the brake-cylinder. At the same time the valves or pistons d, which had closed the exhaust-port h when the brakes were set, now descend and open said ports, as indicated in Fig. 5 and the left-hand view of Fig. 6, whereby the air in the brake-cylinder flows back through pipe D'' and out of the exhaust h, its pressure being sufficient to open the valve I.

The valve e is held upon its seat by the pressure of the jam-nut t when the valve is closed, and it is unseated by the stem g' of the piston d coming in contact with its lower end as the diaphragm is raised to open the valve. At the same time the piston will have closed the exhaust-port, and this, too, before the valve e is unseated, so that there can be no escape of air through the exhaust while the valve e is open.

When the engineer desires, or it becomes necessary, to divide a train without applying the brakes to the front section, the supply of air may be shut off from both pipes, and, after the train is parted, then their cocks E and E' are turned so as to exhaust the air from them, thus relieving the valves of all pressure, and preventing the setting of the brakes on the front section. In this case the brakes are applied directly to the parted rear section, the air being retained in the pipes D by the check-valves in their couplings, the supply coming from the reservoir on the caboose.

The brakeman or conductor in the caboose may apply the brakes independently of the engineer by opening the cock E''' in pipe C, and so turning the compound cock E'' as to allow the air in pipe C to escape. This escaping air may be utilized to blow a whistle, w, and thus notify the engineer, who will cut off the air from pipe C at the main reservoir, either by the valve K or the cock E'.

When the caboose is to run in an opposite direction the cock E''' therein is reversed.

Now, when the train parts, by accident or otherwise, the couplings of the pipes C, which are on the short pieces of hose, separate before those on the longer hose on pipes D. By this means the air begins to escape from pipes C before the pipes D are parted, whereby there is immediately an excess of pressure in said pipes, which is retained by the check-valves in their couplings acting to close said couplings when they part. As before described, this pressure is exerted upon the valves to operate the pistons of the brake-cylinders and apply the brakes. As soon as the air begins to escape from pipes C the check-valve K is operated to close communication between the pipes and reservoir.

It will be understood that this accidental applying of the brakes is quite as effectual as when they are applied directly by the engineer, for the full force of the pressure contained in the two reservoirs is exerted upon the respective sections to which they belong.

If it is not desired that the brakes shall remain set upon the forward section, the pressure may be let out of pipes D until the parted couplings may be secured together so as to unite the pipes C D, and thus prevent loss of air, when it shall be turned on again.

If a train be made up of cars, some of which have the ordinary single line of pipes, and others my apparatus, the whole train of brakes may be operated by cock E in the pipe D at the locomotive, supplying and exhausting from it only.

It will be noticed that the diaphragm is of solid material, and that all of its parts are tight, so that the air is not, and cannot be, taken through it, differing in this essential particular from diaphragms heretofore used for opening and closing communication with a reservoir and brake-cylinder. Should air be permitted to pass through the diaphragm of the valve in this system, the brakes could not be set.

To insure the action of the brakes, the communication with the caboose-reservoirs through pipe C must always be closed, except when used by the brakeman or conductor at the caboose-car to set and release the brakes, said reservoir receiving its supply of air through pipe D only, which is opened and closed by the cock E'''; but this pipe may, as is sometimes desirable, be provided with one of my compound cocks, as at E''.

The caboose-car is not provided with a brake-cylinder and valve; and the object in providing it with the auxiliary reservoir is to store a large supply of air, so as to insure the quick setting of the brakes on all the cars of a long train, but specially those on the rear section of a parted train. This construction also avoids placing auxiliary reservoirs on the several cars of a train, as is now done with the automatic brake in use. In coupling cars with this system, the air is allowed to escape from the pipes C D only, and through the cocks at the engine, the cocks E''' on the caboose being closed, the couplings then parted, and the cars added to the train. The couplings are then united and the air turned into the pipes. The couplings at the end of the caboose, or of the last car of a train not using the caboose, should be united as at A', Fig. 4.

The caboose and reservoir may be dispensed with, as it is only used where there are very long trains.

It will also be noticed that I dispense with stop-cocks to prevent the escape of air from pipes D, for the check-valves in their couplings are amply sufficient.

In this system the brakes are positively set by the direct pressure of air upon their pistons in the cylinders, occasioned or obtained by the destruction of the equilibrium of pressure in the valves and pipes; and they are released, not by direct force of air applied on the opposite side of the pistons through the valves, as in my former patent, but by the withdrawal of the setting pressure occasioned by the re-establishment of an equilibrium of pressure in the valves and pipes C D, differing in this essential from the system claimed in my former patent.

The coupling-hose of the two lines of pipes C D may be of equal lengths instead of different, but they are preferably of different lengths, and one object in making them of different lengths is that thereby the brakeman may be guided in coupling the same pipes of different cars.

What I claim is—

1. In an air-brake valve mechanism, in which an equalized pressure is normally maintained, brake-cylinders, and an air-supply reservoir, in combination with air-retaining pipes having the long couplings provided with check-valves, and air-relieving pipes, provided with the short couplings, substantially as and for the purpose described.

2. The combination, in a train-brake mechanism, consisting of brake-cylinders, valves, and air-pipes, of a locomotive air-reservoir at one end of the pipes, and an independent reservoir at the other end of said pipes, provided with controlling-cocks, whereby air is let into and out of the pipes, substantially as and for the purpose specified.

3. A brake mechanism for freight-trains combining the following elements, viz., a main reservoir, two independent lines of pipes, brake-cylinder valves having diaphragms upon which, so as to close the valves, is normally maintained an equalized pressure, a caboose-car, provided with an auxiliary storing reservoir, and air-supply controlling-cocks, substantially as described.

4. A check-valve, in combination with the compound cocks at the engine-reservoir, independent lines of air-retaining and air-relieving pipes, and a brake-operating valve mechanism, whereby at the parting of the pipe-couplings the check-valve is automatically set, and the air directed into the air-retaining pipes, and cut off from the air-relieving pipes, substantially as described.

5. A valve mechanism B, provided with a solid corrugated diaphragm, L, a loose valve, $e$, and piston $d$, in combination with the induction and exhaust ports of a brake-cylinder, substantially as described.

H. LANSING PERRINE.

Witnesses:
 WM. H. FINCKEL,
 A. C. BRADLEY.